(12) United States Patent
Yamada

(10) Patent No.: US 10,876,852 B2
(45) Date of Patent: Dec. 29, 2020

(54) INFORMATION PROCESSING DEVICE, INFORMATION PROCESSING SYSTEM, NAVIGATION SYSTEM, INFORMATION PROCESSING METHOD, AND PROGRAM

(71) Applicant: GURUNAVI, INC., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 258 days.

(21) Appl. No.: 15/743,510

(22) PCT Filed: Aug. 8, 2016

(86) PCT No.: PCT/IB2016/001094
§ 371 (c)(1),
(2) Date: Jan. 10, 2018

(87) PCT Pub. No.: WO2017/025788
PCT Pub. Date: Feb. 16, 2017

(65) Prior Publication Data
US 2018/0266841 A1   Sep. 20, 2018

(30) Foreign Application Priority Data

Aug. 10, 2015   (JP) ................. 2015-158034

(51) Int. Cl.
*G01C 21/36* (2006.01)
*G06Q 10/04* (2012.01)
*G06Q 10/00* (2012.01)

(52) U.S. Cl.
CPC ....... *G01C 21/3614* (2013.01); *G01C 21/367* (2013.01); *G01C 21/3673* (2013.01); *G06Q 10/00* (2013.01); *G06Q 10/047* (2013.01)

(58) Field of Classification Search
CPC ............. G01C 21/3614; G01C 21/367; G01C 21/3673; G06Q 10/00; G06Q 10/047
(Continued)

(56) References Cited

U.S. PATENT DOCUMENTS

2001/0017668 A1   8/2001   Wilcock et al.
2003/0050753 A1*  3/2003   Ihara ................. G01C 21/3682
                                                              701/454
(Continued)

FOREIGN PATENT DOCUMENTS

JP   10-126731 A   5/1998
JP   10-247201 A   9/1998
(Continued)

OTHER PUBLICATIONS

Communication dated Mar. 27, 2018, from the Japanese Patent Office in counterpart application No. 2015-158034.
(Continued)

*Primary Examiner* — Gertrude Arthur Jeanglaude
(74) *Attorney, Agent, or Firm* — Sughrue Mion, PLLC

(57) ABSTRACT

An information processing device according to the present invention includes storage means, communication means, and control means. The storage means stores therein a spot image associated with a spot on a map. The communication means receives evaluation information for the spot. The control means determines the size or display form of the spot image depending on an attention index obtained from the evaluation information, generates a web site image in which the spot image is placed on the map, and performing control to send the website image to a separate information processing device.

13 Claims, 18 Drawing Sheets

(58) Field of Classification Search
USPC .......................................................... 701/438
See application file for complete search history.

(56) References Cited

U.S. PATENT DOCUMENTS

| | | | |
|---|---|---|---|
| 2005/0251334 A1 | 11/2005 | Mizuno | |
| 2010/0259641 A1 | 10/2010 | Fujimoto | |
| 2015/0213643 A1 | 7/2015 | Obinata | |
| 2015/0286333 A1* | 10/2015 | Shey | G06F 3/0488 345/173 |

FOREIGN PATENT DOCUMENTS

| | | | |
|---|---|---|---|
| JP | 2001-292394 A | 10/2001 | |
| JP | 2001-317955 A | 11/2001 | |
| JP | 2004-347634 A | 12/2004 | |
| JP | 2005-308543 A | 11/2005 | |
| JP | 2006-106953 A | 4/2006 | |
| JP | 2008-241845 A | 10/2008 | |
| JP | 2008-241875 A | 10/2008 | |
| JP | 2010-243907 A | 10/2010 | |
| JP | 2011145407 A | 7/2011 | |
| JP | 2012225751 A | 11/2012 | |
| JP | 2013-016156 A | 1/2013 | |
| JP | 2014115388 A | 6/2014 | |
| JP | 2014209139 A | 11/2014 | |
| JP | 2015-90664 A | 5/2015 | |
| JP | 2015-141259 A | 8/2015 | |

OTHER PUBLICATIONS

Guidelines for Search and examination at the European Patent Office as PCT Authority, B-VIII, 2.2.1 and Euro-PCT Guide, C-I I I, 255.
International Search Report for PCT/IB2016/001094 dated Nov. 3, 2016.
Communication dated Jun. 25, 2019, from the Japanese Patent Office in counterpart application No. 2018-189112.
"About score", Tabelog, Aug. 8, 2009, URL, https://web.archive.org/web/20090808004809/https://tabelog.com/help/score/.
Office Action dated Aug. 14, 2019 from Japanese Patent Office in JP Application No. 2015-158034.
Office Action dated Jan. 28, 2020 from Japanese Patent Office in JP Application No. 2018-189112.
A letter of Prior Art Report dated Sep. 1, 2018 from Sunflare for JP Application No. 2015-158034.
Display photograph of spot on map, How to use Google dictionary, Japan, Nikkei Business Publications, Inc., Jun. 24, 2010, pp. 70-71 (5 pages total).

* cited by examiner

INFORMATION PROCESSING DEVICE, INFORMATION PROCESSING SYSTEM, NAVIGATION SYSTEM, INFORMATION PROCESSING METHOD, AND PROGRAM

CROSS REFERENCE TO RELATED APPLICATIONS

This application is a National Stage of International Application No. PCT/IB2016/001094 filed Aug. 8, 2016, claiming priority based on Japanese Patent Application No. 2015-158034 filed Aug. 10, 2015, the contents of all of which are incorporated by reference herein in their entirety.

BACKGROUND OF THE INVENTION

1. Field of the Invention

The invention relates to an information processing device, an information processing system, a navigation system, an information processing method, and a program which are for displaying an image on a map.

2. Description of Related Art

Websites have been provided which display images for spots (restaurants and tourist facilities, etc.) on maps. The images are prepared in advance by website operators or posted by users. Typically, the images are photographs of restaurant exteriors, dishes, and visitor facilities, etc. Each image is associated with a corresponding spot on a map. Users can view a map and images placed on respective spots on the map by using web browsers or applications for viewing maps. For example, a technology disclosed in Japanese Patent Application Publication No. 2013-016156 has been known.

SUMMARY OF THE INVENTION

However, when a plurality of graphics are displayed on a map, it is difficult for users to view images and select a desired spot. In addition, viewing a map may be inhibited depending on the sizes or the number of images displayed on the map.

The present invention provides an information processing device, an information processing system, a navigation system, an information processing method, and a program which are able to offer enhanced convenience when a plurality of images are displayed on a map.

In order to achieve the above object, an information processing device according to an embodiment of the present invention includes storage means, communication means, and control means.

The storage means stores therein a spot image associated with a spot on a map.

The communication means receives evaluation information for the spot.

The control means determines the size or display form of the spot image depending on an attention index obtained from the evaluation information, generates a website image in which the spot image is placed on the map, and controls the communication means to send the website image to a separate information processing device.

According to this configuration, the size or display form of the spot image placed on the map is determined depending on the attention index obtained from the evaluation information for the spot. Accordingly, the spot image having a higher attention is displayed larger on the map, and the spot image having a lower attention is displayed smaller on the map. Therefore, a user can easily see the spot having the higher attention. Further, the spot having the lower attention is suppressed from covering the map, thereby enhancing convenience of the map.

When the spot image is overlapped with another spot image on the map, the control means may generate the website image in which the spot image is placed outside the map and the spot image is connected, by a connection line, with the spot which is on the map and which is associated with the spot image.

According to this configuration, overlapping of the spot images on the map can be eliminated and visibility of the spot images can be enhanced while correspondence between the spot on the map and the spot image is specified.

When an occupation ratio of the spot image on the map is equal to or greater than a predetermined ratio, the control means may generate the website image in which the spot image is placed outside the map and the spot image is connected, by a connection line, with the spot which is on the map and which is associated with the spot image.

According to this configuration, covering the map with the spot image can be reduced and visibility of the map can be enhanced while correspondence between the spot on the map and the spot image is specified.

The control means gives the spot image an identifier indicating image details, and when the communication means receives, from the separate information processing device, an acquisition request for the website image including a search condition, the control means selects, as the spot image to be placed in the website image, the spot image to which the identifier corresponding to the search condition is given.

According to this configuration, when a user specifies a search condition, the spot image matching the search condition is placed in the website image, thereby enhancing convenience for the user.

In order to achieve the above object, an information processing device according to another embodiment of the present invention includes storage means, communication means, and control means.

The storage means stores therein a spot image associated with a spot on a map.

The communication means receives evaluation information for the spot.

The control means determines the display form of the spot image depending on an attention index obtained from the evaluation information, generates a website image in which the spot image is placed on the map, and controls the communication means to send the website image to a separate information processing device.

According to this configuration, the display form of the spot image placed on the map is determined depending on the attention index obtained from the evaluation information for the spot. Setting the visibility of the spot image having a higher attention to be higher and visibility of the spot image having a lower attention to be lower enables a user to easily see the spot having the higher attention. Further, covering the map with the spot image of the spot having the lower attention is reduced, thereby enhancing convenience of the map.

When the spot images are overlapped with one another on the map, the control means may select, with a frequency according to the attention index, the spot image to be placed on the map from among the overlapping spot images.

According to this configuration, the spot image of the spot having a higher attention can be displayed with a higher frequency while the spot image of the spot having a lower attention can be displayed with a lower frequency. Therefore, a user can easily see the spot image of the spot having the higher attention.

When the spot images are overlapped with one another on the map, the control means may cause the overlapping spot images to overlap with one another in an order according to the attention indexes.

According to this configuration, the spot images can be overlapped and displayed such that the spot image of the spot having a higher attention is in a higher hierarchy and the spot image of the spot having a lower attention is in a lower hierarchy. Therefore, a user can easily see the spot image of the spot having the higher attention.

In order to achieve the above object, an information processing device according to still another embodiment of the present invention includes control means.

The control means determines the size or display form of a spot image associated with a spot on a map depending on an attention index obtained from evaluation information for the spot, and generates an image in which the spot image is placed on the map.

In order to achieve the above object, an information processing system according to still another embodiment of the present invention includes: a first information processing device that includes storage means, first communication means, and first control means; and a second information processing device that includes second communication means and second control means.

The storage means stores therein a spot image associated with a spot on a map.

The first communication means receives evaluation information for the spot.

The first control means determines the size or display form of the spot image depending on an attention index obtained from the evaluation information, generates a website image in which the spot image is placed on the map, and controls the first communication means to send the website image to the second information processing device.

The second communication means receives the website image from the first communication means.

The second control means causes the website image to be displayed.

In order to achieve the above object, a navigation system according to still another embodiment of the present invention includes: an information processing device that includes storage means, first communication means, and first control means; and a navigation device that includes second communication means and second control means.

The storage means stores therein a spot image associated with a spot on a map.

The first communication means receives evaluation information for the spot.

The first control means controls the first communication means to send the evaluation information and the spot image to the navigation device.

The second communication means receives the evaluation information and the spot image from the information processing device.

The second control means determines the size or display form of the spot image depending on an attention index obtained from the evaluation information, generates a map image in which the spot image is placed on the map, and causes the map image to be displayed.

In order to achieve the above object, an information processing method according to still another embodiment of the present invention includes: storing a spot image associated with a spot on a map; receiving evaluation information for the spot; and determining the size or display form of the spot image depending on an attention index obtained from the evaluation information, generating a website image in which the spot image is placed on the map, and performing control to send the website image to a separate information processing device.

In order to achieve the above object, a program according to still another embodiment of the present invention causes an information processing device to execute: a step of storing a spot image associated with a spot on a map; a step of receiving evaluation information for the spot; and a step of determining the size or display form of the spot image depending on an attention index obtained from the evaluation information, generating a website image in which the spot image is placed on the map, and performing control to send the website image to a separate information processing device.

As described above, the present invention can provide an information processing device, an information processing system, a navigation system, an information processing method, and a program which are able to offer enhanced convenience when displaying images on a map. However, the present invention is not limited by this advantageous effect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Descriptions will be given of an information processing system according to an embodiment of the present invention.

Configuration of Information Processing System

Figure 1:
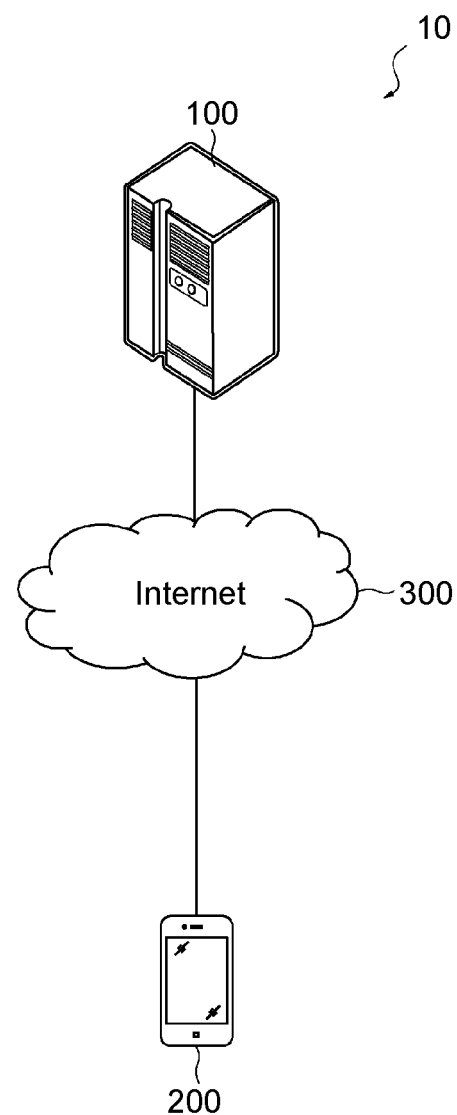
FIG. 1 is a schematic diagram of configuration of an information processing system according to an embodiment of the present invention.

FIG. 1 is a schematic diagram of configuration of an information processing system 10 according to the present embodiment. As illustrated in FIG. 1, the information processing system 10 includes a server device 100 and a user terminal 200. The server device 100 and the user terminal 200 are connected with each other via an internet 300.

The server device 100 is a web server providing a website (hereinafter, "map site") including map information. The user terminal 200 is an information processing device capable of accessing the map site via the internet 300. For example, the user terminal 200 is a smartphone, a cellular phone, a tablet PC (personal computer), a laptop PC, a desktop PC, a navigation device, or the like.

Figure 2:
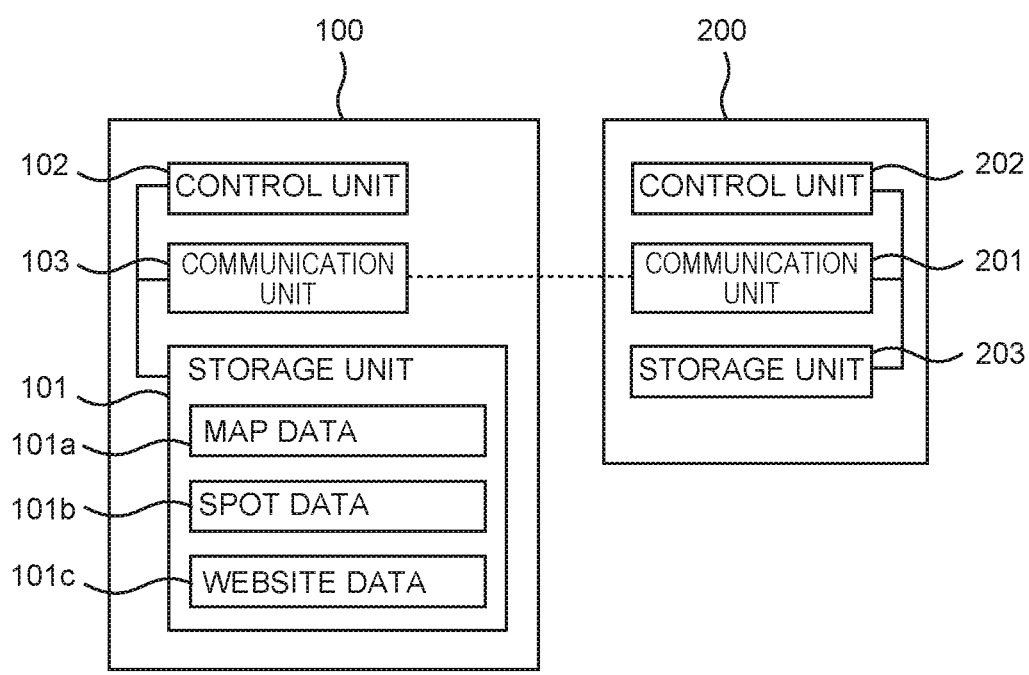
FIG. 2 is a block diagram illustrating the functional configuration of the information processing system.

FIG. 2 is a block diagram illustrating the functional configurations of the server device 100 and the user terminal 200. As illustrated in FIG. 2, the server device 100 includes a storage unit 101, a control unit 102, and a communication unit 103. The functional configuration constituted of these components can be provided by cooperation of hardware and software.

The storage unit 101 stores therein map data 101a, spot data 101b, and website data 101c.

The map data 101a is digital data of a map. The map data 101a is typically GIS (geographic information system) data.

The spot data 101b is associated with a spot on the map data 101a. The spot is not limited to a particular type, and indicates a restaurant, a tourist facility, or the like. Each spot is provided with the corresponding spot data 101b. The number of the spot data 101b is not limited to a particular number.

Figure 3:
FIG. 3 is an example of spot data stored in a storage unit of a server device included in the information processing system.

FIG. 3 is a schematic diagram illustrating an example of the spot data 101b. As illustrated in FIG. 3, the spot data 101b includes a location, a spot image G, an evaluation score, etc. of the corresponding spot.

The location of the spot may be represented by an address, a coordinate (a latitude and a longitude), etc. The spot image G is an image set for the corresponding spot, and is a photo, a graphic, or an icon, etc. of the exterior or interior of a restaurant, dishes offered by the restaurant, or a tourist facility, etc. One or more spot images may be set for the corresponding spot.

The evaluation score indicates evaluation for the corresponding spot given by a map site operator or users of the map site. The users of the map site include curators (people who collect, organize, and provide information to other users) in addition to ordinary users.

In addition to the aforementioned information, the spot data 101b may include a spot category (Ramen restaurants, curry restaurants, pubs, and the like), and a spot condition (whether the spot can be fully booked for a private party, whether the spot is good for lunch, and the like). Information included in the spot data 101b is not limited to a particular kind, as long as at least the location and one or more images of the spot are included.

The spot data 101b may be created by the map site operator, or may be created by a user of the map site. In a typical case, the map site operator inputs locations and spot images and publishes the locations and the images on the website, the users of the map site post an evaluation score or a review for each spot, and thus, the spot data 101b is created. Further, a user of the map site may post a spot image (a photograph of a dish, etc.), and a user of the map site may create new spot data 101b.

The website data 101c is information for generating the map site, and includes the layout of the map site, character strings, image data, and CGIs (common gateway interface) to be displayed on the map site, and the like.

The control unit 102 generates an image (hereinafter, "map site image") for the map site from the data stored in the storage unit 101 and causes the communication unit 103 to send the image. The control unit 102 uses the evaluation information for the spots to generate the map site image, which will be described in detail later.

Under the control by the control unit 102, the communication unit 103 communicates with the user terminal 200 and other user terminals (not illustrated). For example, the communication unit 103 can receive the evaluation information for the spot data 101b from another user terminal and send to the user terminal 200 the map site image generated by the control unit 102.

The user terminal 200 includes a communication unit 201, a control unit 202, and a storage unit 203. The functional configuration constituted of these components can be provided by cooperation of hardware and software.

Under control by the control unit 202, the communication unit 201 communicates with the communication unit 103 of the server device 100. More specifically, the communication unit 201 can send a map-site-image acquisition request to the communication unit 103 and acquire the map site image from the communication unit 103.

The control unit 202 outputs to a display the map site image received by the communication unit 201 to display the map site image on the display.

The storage unit 203 stores therein the map site image received by the communication unit 201.

Operations of Information Processing System

Figure 4:
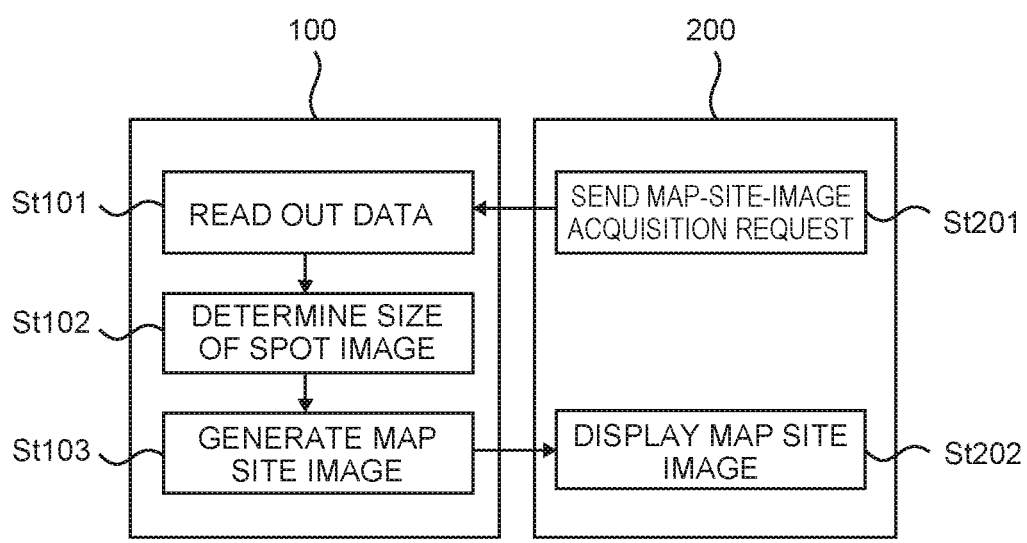
FIG. 4 is a flowchart showing operations of the information processing system.

Operations of the information processing system 10 will be described. FIG. 4 is a flowchart showing operations of the server device 100 and the user terminal 200. In the storage unit 101, the map data 101a, the spot data 101b, and the website data 101c are stored in advance.

First, the control unit 202 controls the communication unit 201 to send the map-site-image acquisition request so that the communication unit 201 sends the request to the communication unit 103 (St 201). The map-site-image acquisition request includes the center coordinate and scale of a map which is desired to be acquired.

Further, the map-site-image acquisition request may include a search condition specified by a user. Examples of the search condition include an establishment category such as "a Ramen restaurant" and a dish name such as "Jiaozi". The user can specify the search condition by inputting a search character string, or checking a check box. The control unit 202 can cause sending of the map-site-image acquisition request in response to an operation input inputted by the user through a web browser or an application.

When the communication unit 103 receives the map-site-image acquisition request, the control unit 102 reads out the map data 101a, the spot data 101b, and the website data 101c from the storage unit 101 (St 101).

The control unit 102 can read out the necessary spot data 101b on the basis of the center coordinate or the scale of the map included in the map-site-image acquisition request. For example, the control unit 102 may read out the spot data 101b of which the location is positioned within a predetermined distance from the center coordinate of the map included in the request.

Further, when the request includes the search condition, the control unit 102 can read out only the spot data 101b corresponding to the search condition. For example, when the search condition is "Ramen restaurants", the control unit 102 can read out only the spot data 101b corresponding to Ramen restaurants.

Next, for the spot data 101b read out from the storage unit 101, the control unit 102 determines the size of a spot image depending on an attention index obtained from evaluation information of the spots (St 102).

Specifically, the evaluation information for each spot is an evaluation score (see FIG. 2), the number of posts, or the number of posted spot images for the spot. The control unit 102 can set any one of the above numeric values as the attention index.

The control unit 102 can set the attention index by combining a plurality of kinds of evaluation information. For example, the control unit 102 may set the evaluation score as the attention index for a spot having a predetermined number or more of posts. The evaluation score for the corresponding spot may be a score evaluated by the users or a score evaluated by the curators.

The control unit 102 determines the size of the spot image included in the spot data 101b by using the attention index. For example, the control unit 102 can make the area or the side lengths of the spot image proportional to the attention index.

When the spot data 101b includes a plurality of spot images, the control unit 102 selects one spot image. For example, the control unit 102 can select a spot image posted at the latest time. When the spot data 101b includes a spot image set by the map site operator and a spot image posted by a user of the map site, the control unit 102 can select the spot image set by the map site operator. The control unit 102 determines the size of the selected spot image depending on the attention index.

Figure 5:
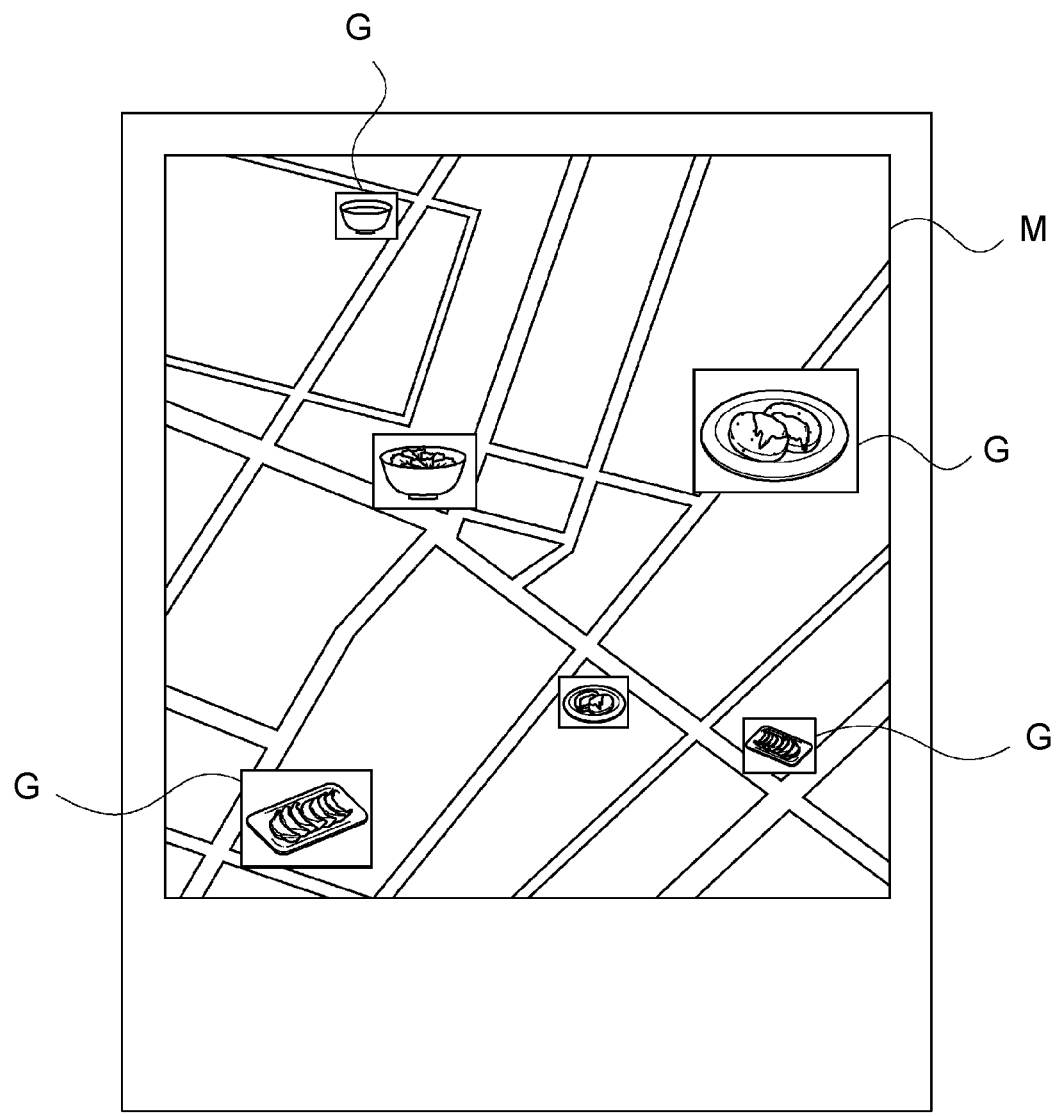
FIG. 5 is an example of an image generated by a user terminal included in the information processing system.

Next, the control unit 102 generates a map site image (St 103). FIG. 5 is an example of the map site image, and includes a map M and spot images G. The control unit 102 identifies the position for the corresponding spot on the map on the basis of the location included in the spot data 101b, and places the corresponding spot image of the spot on or near the spot.

The size of the spot image has been determined at the prior step. The control unit 102 may generate the map site image by placing, together with the spot image, the name or evaluation score of the spot included in the spot data 101b. In addition, the control unit 102 may generate the map site image by using an image, a character string, and a layout included in the website data 101c.

The control unit 102 controls the communication unit 103 to send the generated map site image to the communication unit 201. The control unit 202 outputs the map site image received by the communication unit 201 to display the map site image on the display (St 202).

The information processing system performs the aforementioned operations. As described above, the spot image is displayed on the map site image in a size that is determined depending on the attention index obtained from the evaluation information for the corresponding spot. Accordingly, a user can easily see a spot having a higher attention among the spots on the map. Further, since a spot image having a lower attention is displayed smaller, the spot having the lower attention does not disturb a user who watches the map, and thus, the excellent convenience is exerted. That is, since a user can easily see a spot having a higher attention without enlarging each part of the map site image or requesting detail information to the server device 100 of the information processing system, the entire load applied to the server device 100 is reduced. In order to respond to an image-data enlargement request from a user, the server device 100 receives a large load applied thereto because the capacity of image data is particularly large.

Another Method for Generating Map Site Image

As described above, the control unit 102 generates the map site image including the spot image the size of which is determined depending on the attention index. However, the following method may be also adopted.

Figure 6:
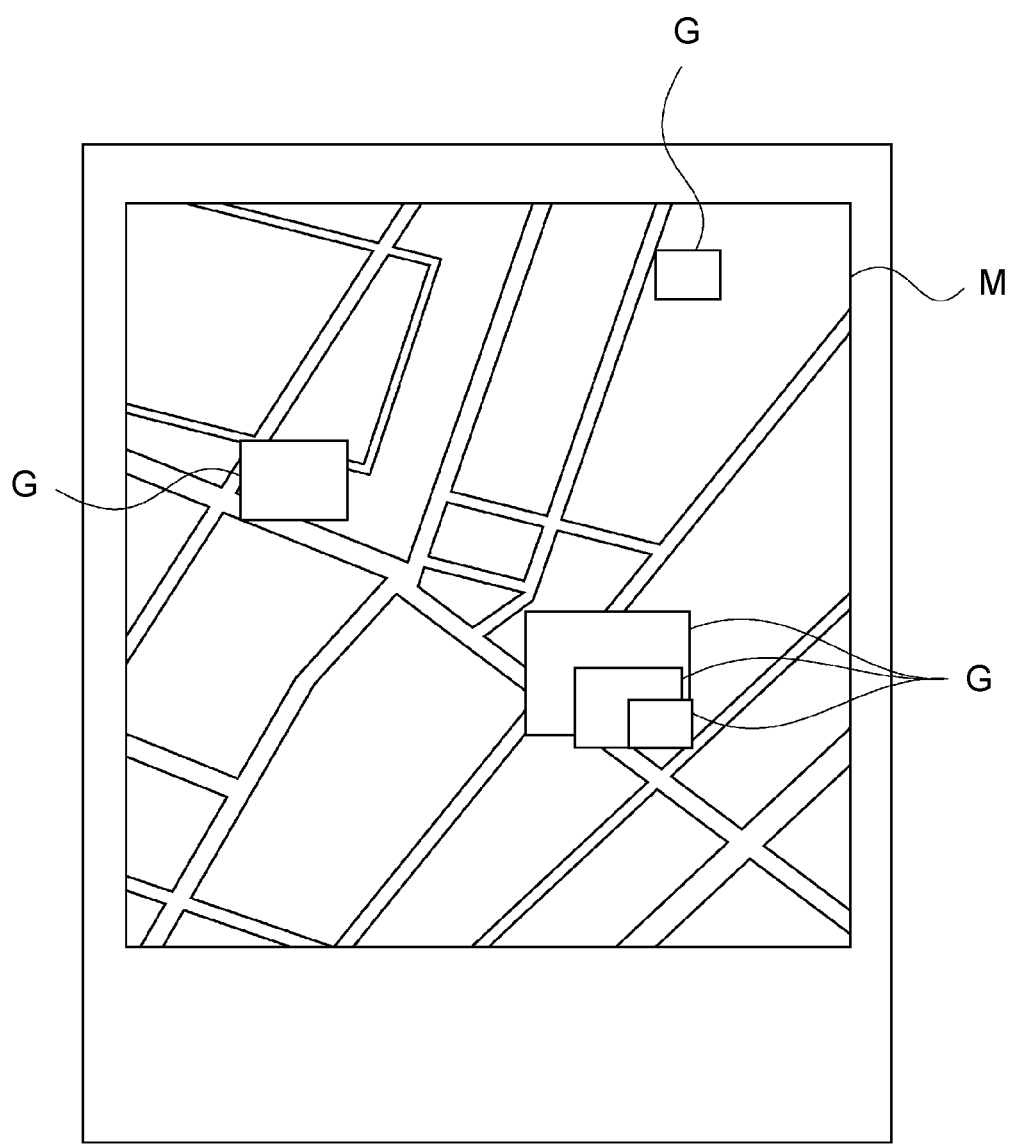
FIG. 6 is an example of an image generated by the user terminal included in the information processing system.

FIG. 6 is another example of a map site image generated by the control unit 102. As illustrated in FIG. 6, when the spot images G are overlapped with one another in the same region on the map M, viewing the respective spot images G is difficult. To address this difficulty, the control unit 102 can calculate an overlapping degree at the map-site-image generating step (St 103).

The overlapping degree is a numerical value indicating a degree of overlapping of spot images, and may be a ratio of the area of another spot image to the area of a specific spot image, for example. When two or more other spot images are overlapped with the specific spot image, the overlapping degrees may be weighted.

Figure 7:
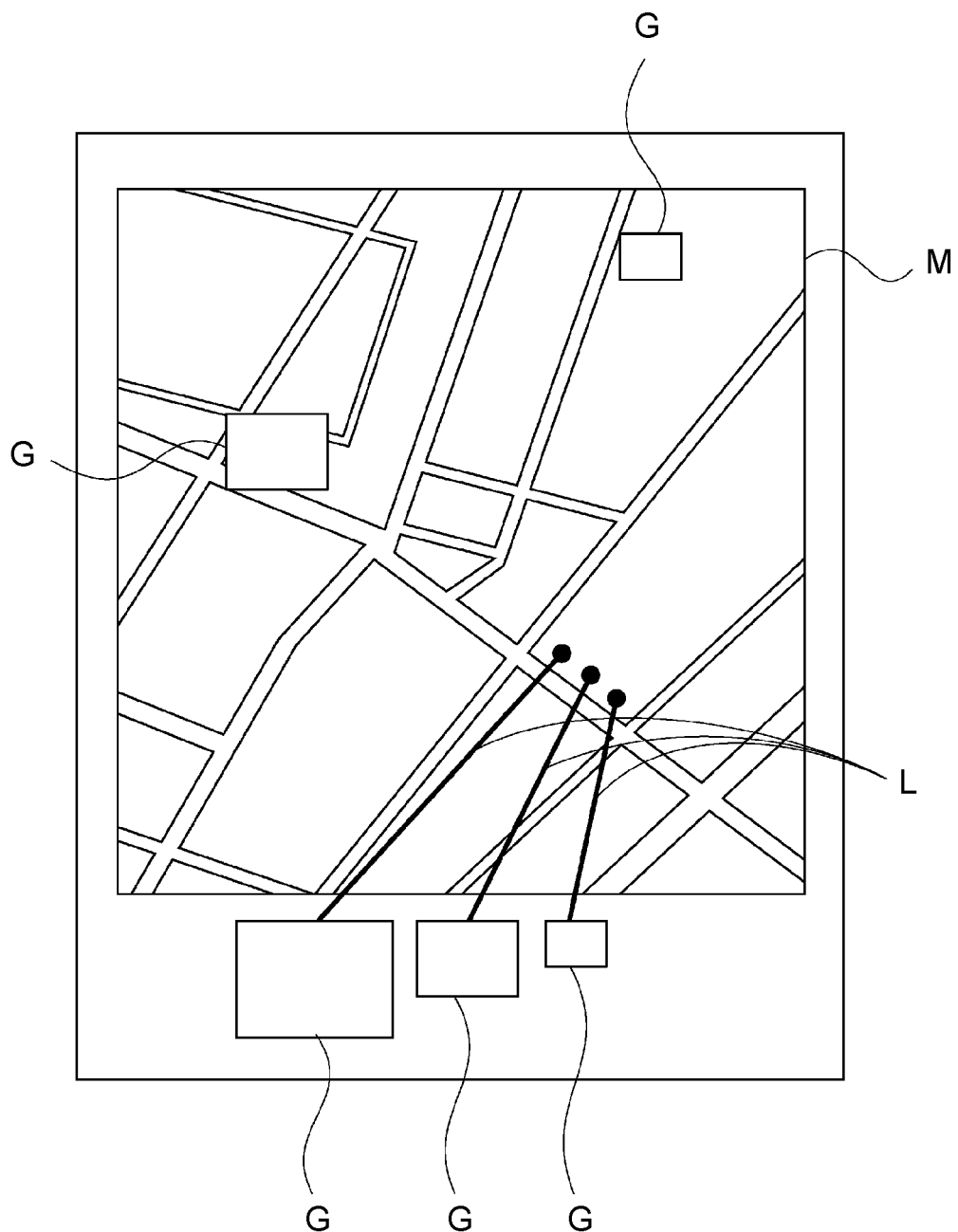
FIG. 7 is an example of an image generated by the user terminal included in the information processing system.

When the overlapping degrees of the respective spot images are each equal to or greater than a predetermined value, the control unit 102 can eliminate of overlapping of the spot images by moving the spot images so as to obtain the overlapping degrees lower than the predetermined value. FIG. 7 is an example of the map site image in which the spot images G have been moved. As illustrated in FIG. 7, the control unit 102 can move the spot images G overlapped with one another in FIG. 6 to the outside of the map M.

At that time, the control unit 102 may connect the spot images G having been moved to the outside to the spots corresponding to the spot images G by respective connection lines L to specify the correspondences between the spots and the spot images. The control unit 102 may place, at an original position, the spot image which does not overlap with any other spot image. Alternatively, the control unit 102 may eliminate overlapping by moving the spot images overlapping with one another to other positions on the map.

Figure 8:
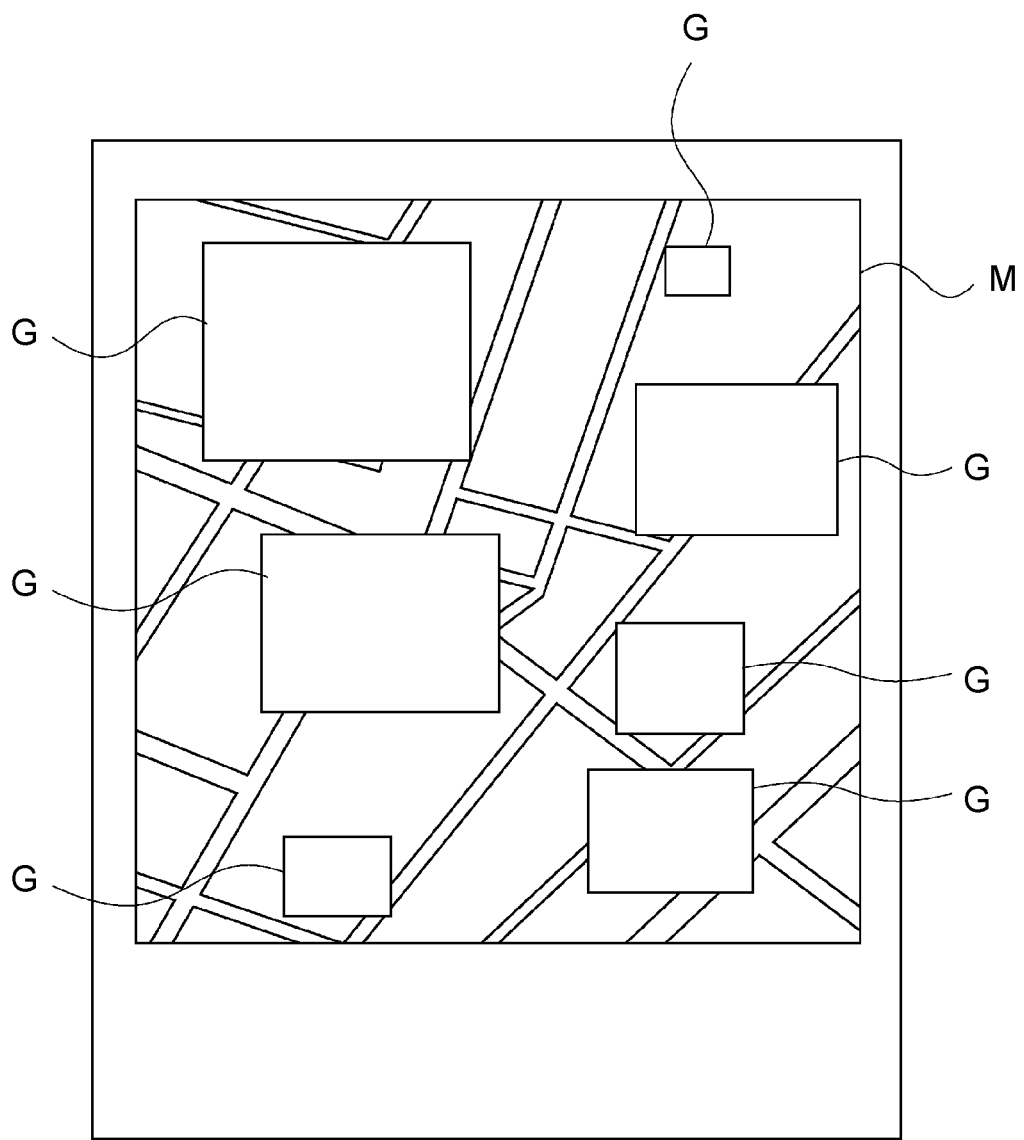
FIG. 8 is an example of an image generated by the user terminal included in the information processing system.

Alternatively, the control unit 102 may generate a map site image by the following manner. FIG. 8 is another example of a map site image generated by the control unit 102. As illustrated in FIG. 8, when a number of large spot images G are placed on the map M, viewing the map M is difficult. To address this difficulty, the control unit 102 can calculate a degree of map covering at the map-site-image generating step (St 103).

Figure 9:
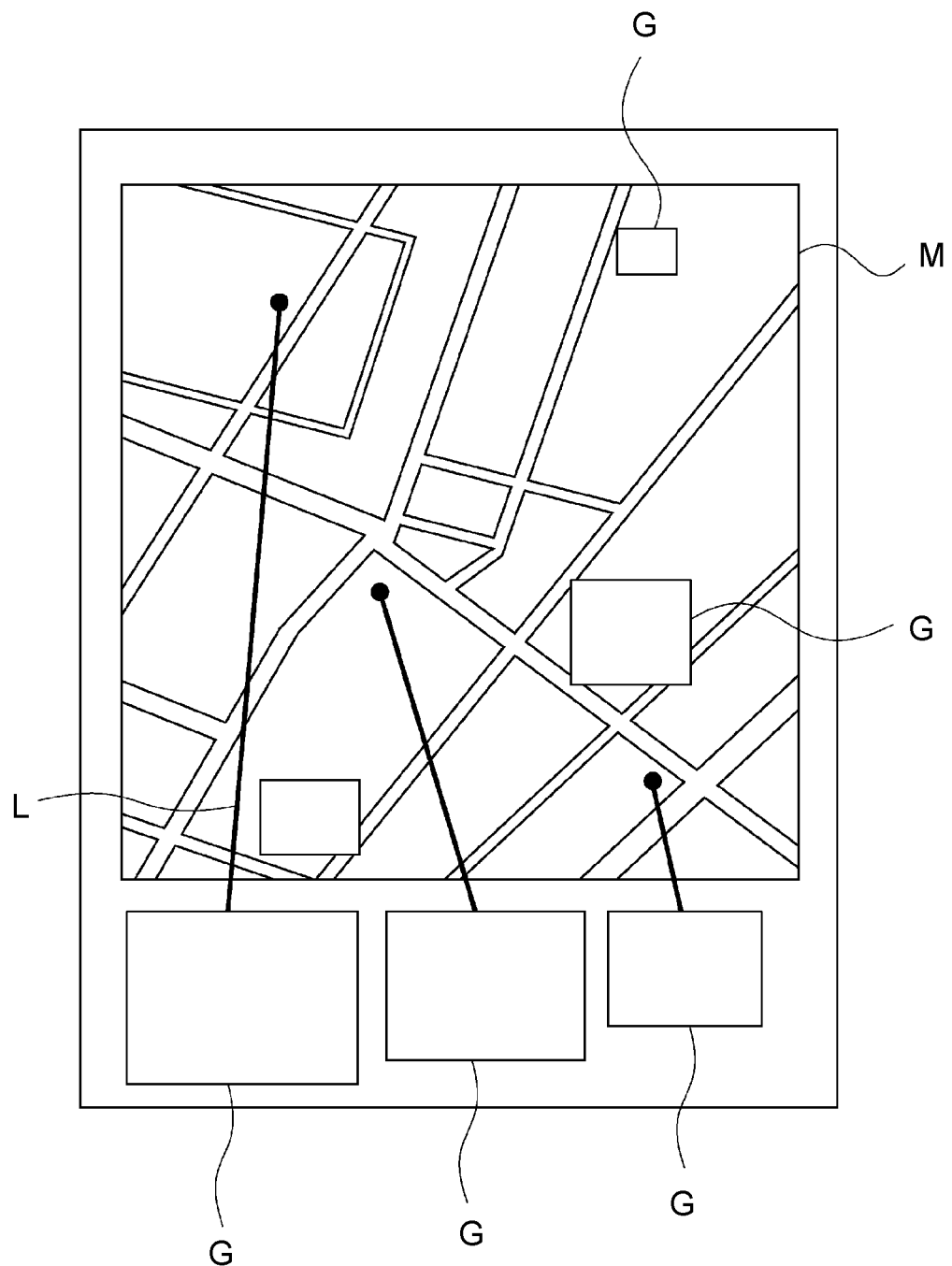
FIG. 9 is an example of an image generated by the user terminal included in the information processing system.

The degree of map covering is a numerical value indicating a degree to which the spot images G cover the map M, and may be a ratio of the total area of the spot images G to the area of the map M, for example. When the degree of map covering is equal to or greater than a predetermined value, the control unit 102 can reduce covering of the map M with the spot images G by moving the spot images G so as to obtain the degree of map covering lower than the predetermined value. FIG. 9 is an example of a map site image in which covering of the map M with the spot images has been reduced. As illustrated in FIG. 9, the control unit 102 can move the spot images G to the outside of the map M.

At that time, the control unit 102 may connect the spot images G having been moved to the outside to the spots corresponding to the spot images G by respective connection lines L to specify the correspondences between the spots and the spot images. The control unit 102 may sequentially move, to the outside of the map M, the spot images in a descending order of size until the degree of map covering becomes lower than the predetermined value.

When the degree of map covering is equal to or greater than the predetermined value, the control unit 102 may reduce the covering of the map with the spot images by reducing the spot images by a fixed rate. Reduction of the spot images at the fixed ratio enables improvement of the visibility of the map while keeping the relative size correspondence among the spot images depending on the attention indexes.

In addition, the control unit 102 may move the spot images to the outside of the map depending on the scale of the map. When the scale of the map is small, the region on the map covered with the spot images becomes large. However, the visibility of the map can be improved by moving the spot images to the outside of the map. For example, when the scale of the map is smaller than a predetermined value, the control unit 102 may move only the spot images of a large size to the outside of the map, and when the scale of the map is further smaller, the control unit 102 may move all the spot images to the outside of the map. Alternatively, the control unit 102 may reduce the spot images by a fixed ratio depending on the scale of the map, instead of moving the spot images to the outside of the map.

Selection of Spot Images

In the above descriptions, the control unit 102 is assumed to generate the map site image by using the spot data 101b created by the map site operator or the map site users. However, the control unit 102 may select the spot images depending on the search condition included in the map-site-image acquisition request.

More specifically, when the spot data 101b is created or when a spot image is posted, the control unit 102 can provide the spot image with an identifier indicating details of the image. For example, the details of the image indicate a dish name (e.g., "Jiaozi"). The control unit 102 may provide the identifier in response to an input from the creator of the spot data 101b or the poster of the spot image, or may provide the identifier by judging the details of the image through image processing (object recognition processing, etc.) on the spot image.

The control unit 102 can select the spot images to be placed on the map site image by using the identifiers at the step (St 103) of determining the sizes of the spot images. When the map-site-image acquisition request includes a search condition, the control unit 102 can select the spot image provided with the identifier corresponding to the search condition, and place the selected spot image on the map site image.

Accordingly, when a user of the map site specifies the search condition by inputting a search character string, checking a check box, or the like, the spot image matching the search condition is placed on the map site image. For example, when the search condition is "Jiaozi", not an image of Ramen but an image of Jiaozi is displayed even if the spot is "a Ramen restaurant".

Hardware Configuration

Figure 10:
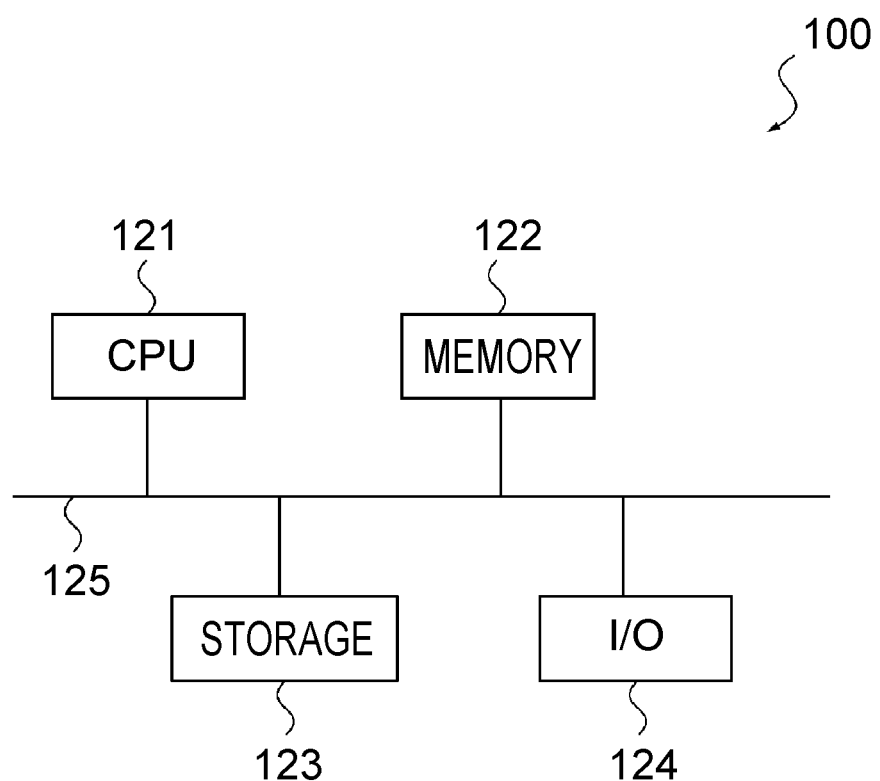
FIG. 10 is a block diagram illustrating a hardware configuration of the server device included in the information processing system.

FIG. 10 is a block diagram illustrating the hardware configuration of the server device 100. As illustrated in FIG. 10, the server device 100 includes, as the hardware configuration, a CPU (central processing unit) 121, a memory 122, a storage 123, and an input/output unit (I/O) 124. These components are connected with one another via a bus 125.

The CPU 121 controls, in accordance with a program stored in the memory 122, other components, performs data processing in accordance with the program, and stores the processing result in the memory 122. The CPU 121 functions as the control unit 102 in the functional configuration of the server device 100.

The memory 122 temporarily stores therein the program to be executed by the CPU 121 and the data. The memory 122 may be a RAM (random access memory). The memory 122 functions, together with the storage 123, as the storage unit 101 in the functional configuration of the server device 100.

The storage 123 stores therein a program and data. The storage 123 may be an HDD (hard disk drive), an SSD (solid state drive), or the like. The storage 123 functions, together with the memory 122, as the storage unit 101 in the functional configuration of the server device 100.

The input/output unit 124 receives an input to the user terminal 200 and supplies an output from the server device 100 to the outside. The input/output unit 124 includes a connection interface for a network, etc. The input/output unit 124 functions as the communication unit 103 in the functional configuration of the server device 100.

The hardware configuration of the server device 100 is not limited to the configuration described herein, as long as the functional configuration of the server device 100 is realized. In addition, a part or the whole of the above hardware configuration may exist on a network.

Figure 11:
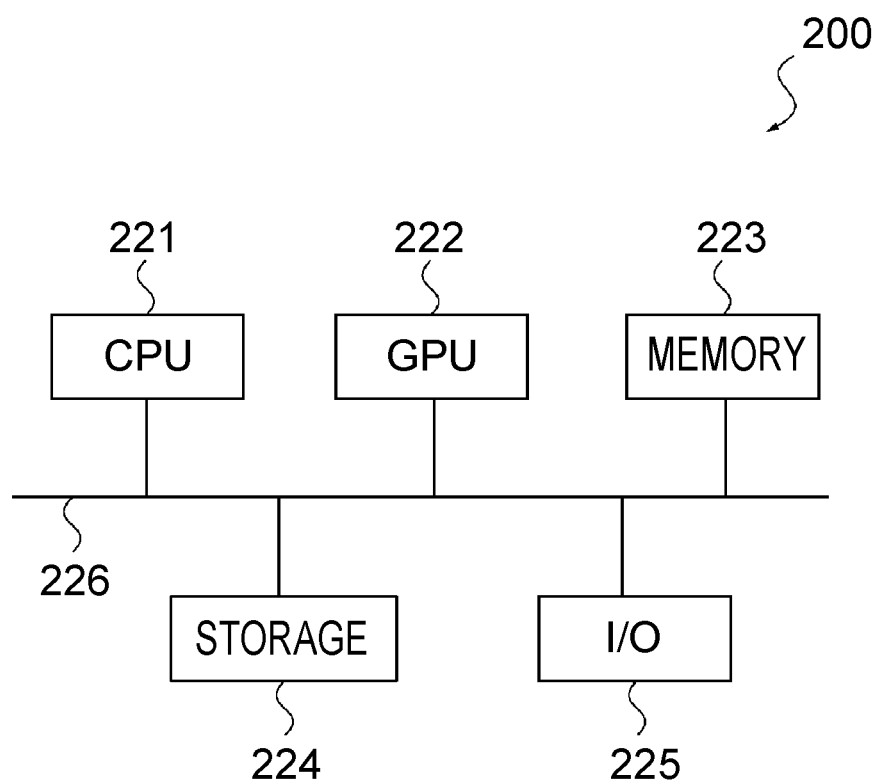
FIG. 11 is a block diagram illustrating a hardware configuration of the user terminal included in the information processing system.

FIG. 11 is a block diagram illustrating the hardware configuration of the user terminal 200. As illustrated in FIG. 11, the user terminal 200 includes, as the hardware configuration, a CPU 221, a GPU (graphic processing unit) 222, a memory 223, a storage 224, and an input/output unit (I/O) 225. These components are connected with one another via a bus 226.

The CPU 221 controls other components in accordance with a program stored in the memory 223, performs data processing in accordance with the program, and stores the processing result in the memory 223. The CPU 221 functions, together with the GPU 222, as the control unit 202 in the functional configuration of the user terminal 200.

The GPU 222 generates an image under the control by the CPU 221. The GPU 222 may be a microprocessor. The GPU 222 functions, together with the CPU 221, as the control unit 202 in the functional configuration of the user terminal 200.

The memory 223 stores therein the program to be executed by the CPU 221 and the data. The memory 223 may be a RAM. The memory 223 functions, together with the storage 224, as the storage unit 203 in the functional configuration of the user terminal 200.

The storage 224 stores therein a program and data. The storage 224 may be an HDD, an SSD, or the like. The storage 224 functions, together with the memory 223, as the storage unit 203 in the functional configuration of the user terminal 200.

The input/output unit 225 receives an input to the user terminal 200 and supplies an output from the user terminal 200 to the outside. The input/output unit 225 includes an input device such as a keyboard and a mouse, an output device such as a display, and a connection interface for a network, etc. The input/output unit 225 functions as the communication unit 201 in the functional configuration of the user terminal 200.

The hardware configuration of the user terminal 200 is not limited to the configuration described herein, as long as the functional configuration of the user terminal 200 is realized. In addition, a part or the whole of the above hardware configuration may exist on a network.

Modification

The present invention is not limited only to the above embodiment, and various modifications can be made within the scope of the subject matters of the present disclosure.

(Change of Display Frequency of Spot Image)

Figure 12:
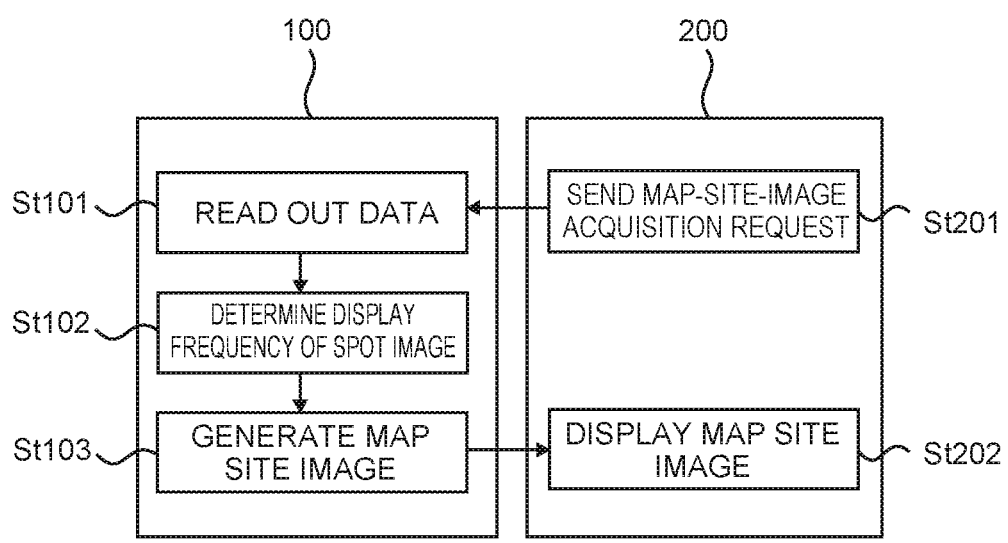
FIG. 12 is a flowchart showing operations of an information processing system according to a modification of the present invention.

In the above embodiment, the control unit 102 determines the size of a spot image depending on the attention index. However, a frequency of displaying a spot image may be determined depending on the attention index. FIG. 12 is a flowchart showing operations of the information processing system 10 according to a modification.

As illustrated in FIG. 12, when the communication unit 103 receives the map-site-image acquisition request, the control unit 102 reads out the map data 101a, the spot data 101b, and the website data 101c from the storage unit 101 (St 101).

The control unit 102 can read out the necessary spot data 101b from the center coordinate or the scale of the map included in the map-site-image acquisition request. For example, the control unit 102 may read out the spot data 101b of which the location is positioned within a predetermined distance from the center coordinate of the map included in the request.

Next, for the spot data 101b read out from the storage unit 101, the control unit 102 determines a frequency of displaying the spot image depending on the attention index obtained from the evaluation information for the corresponding spot (St 102). The control unit 102 can set the display frequency of the spot image of a spot having a higher attention index to be higher, and set the display frequency of the spot image of a spot having a lower attention index to be lower.

Next, the control unit 102 generates a map site image (St 103). The control unit 102 identifies the position for the corresponding spot on the map on the basis of the location included in the spot data 101b, and places the spot image of the spot on or near the spot.

Figure 13:
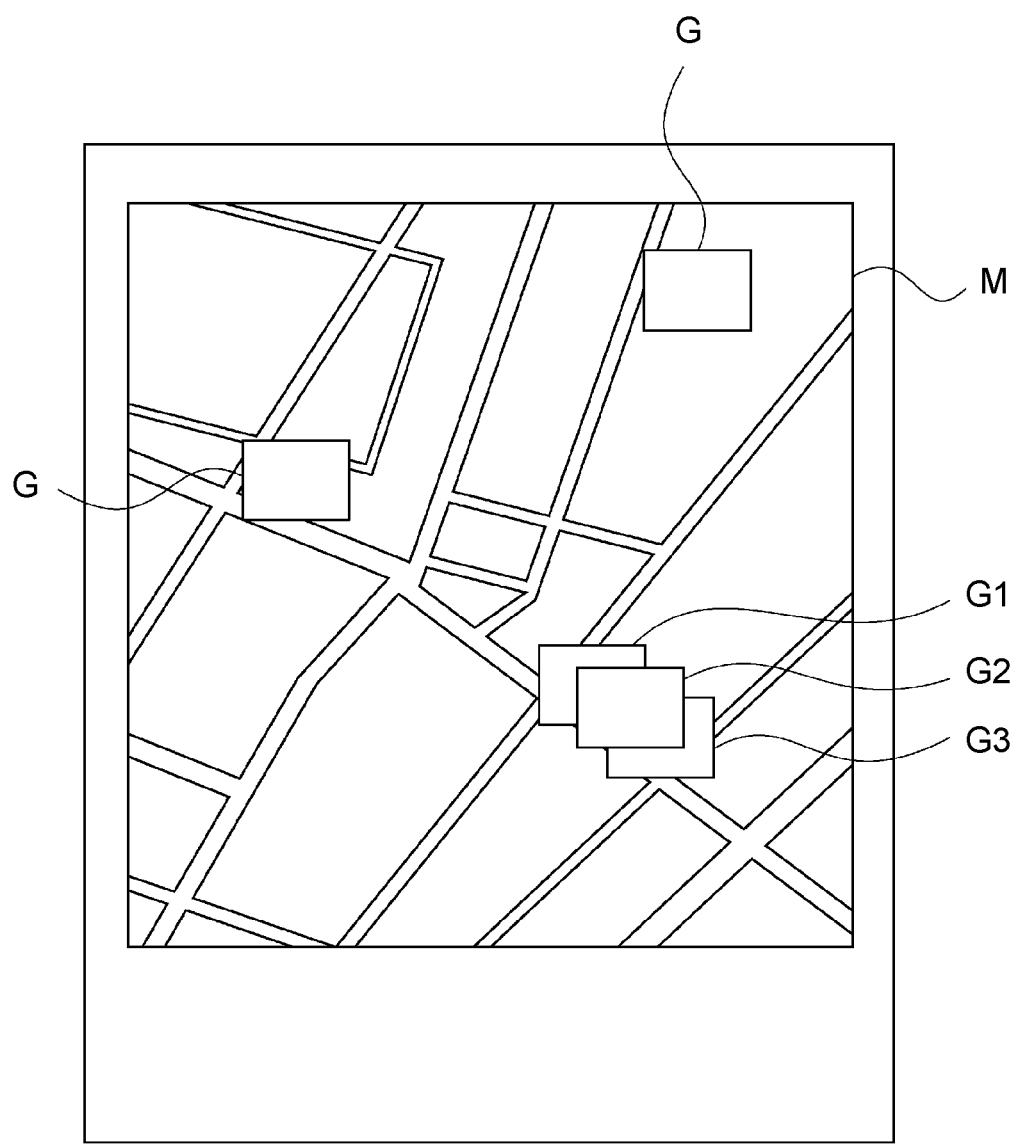
FIG. 13 is an example of an image generated by the user terminal included in the information processing system.
Figure 14:
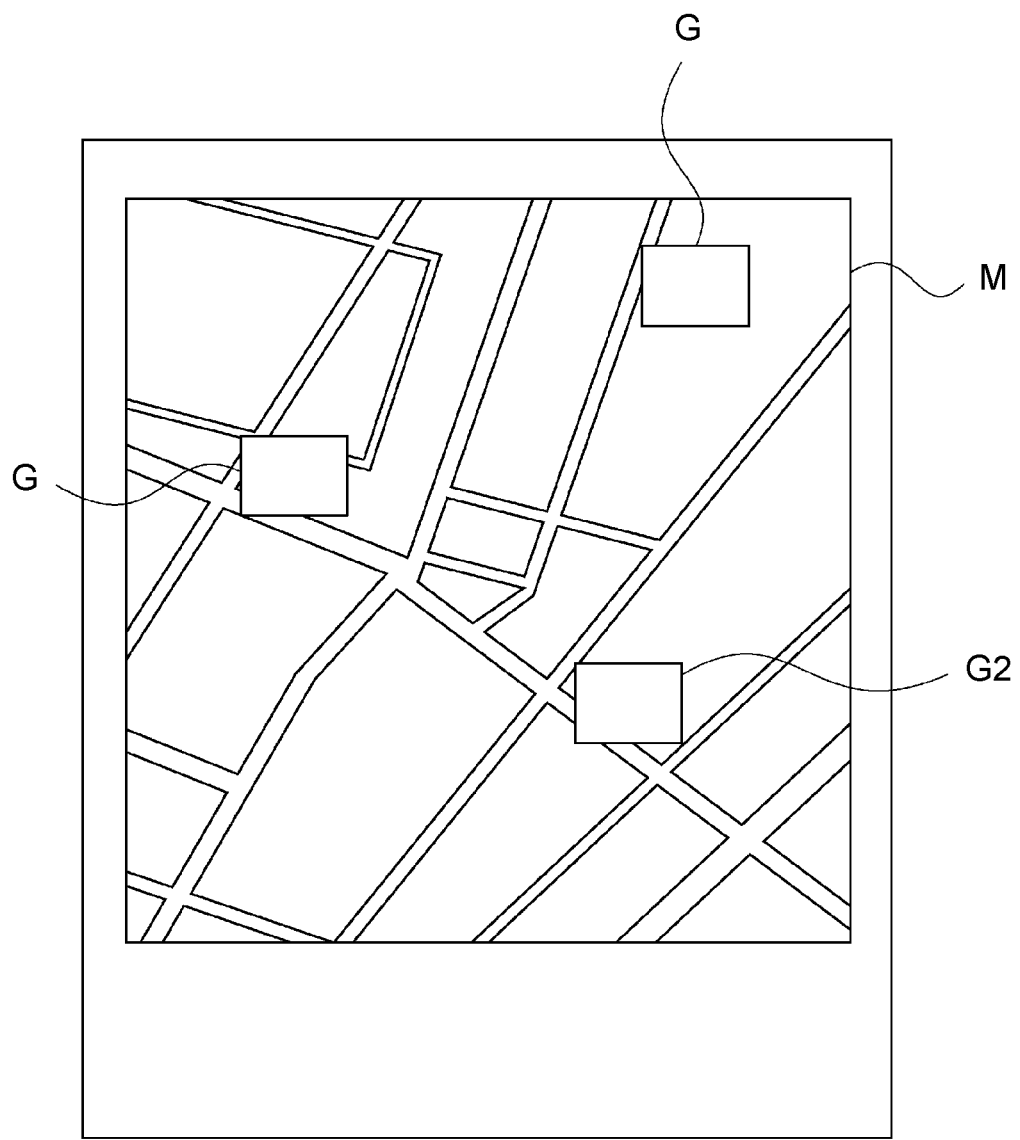
FIG. 14 is an example of an image generated by the user terminal included in the information processing system.

FIG. 13 and FIG. 14 are examples of map site images generated by the control unit 102. As illustrated in FIG. 13, when spot images G1 to G3 are overlapped with one another on the map M, the control unit 102 may place only one of the overlapping spot images G1 to G3 on the map without placing the other spot images on the map. In FIG. 14, only the spot image G2 is placed on the map. The control unit 102 can select the spot image to be placed on the map with the display frequency determined at the prior step.

The control unit 102 controls the communication unit 103 to send the generated map site image to the communication unit 201. The control unit 202 outputs the map site image received by the communication unit 201 to the display to display the map site image on the display (St 202).

The information processing system 10 performs the aforementioned operations. As described above, the spot images are displayed on the map site image with the display frequencies determined depending on the attention indexes obtained from the evaluation information for the respective spots. Accordingly, a user can easily see a spot having a higher attention. Further, since a spot having a lower attention is displayed with a lower frequency, the spot having the lower attention does not disturb a user who watches the map, and thus, the excellent convenience is exerted. Further, since the frequency of displaying the spot image having the lower attention is lowered, load applied to the server 100 is reduced.

(Change of Display Hierarchy of Spot Image)

Figure 15:
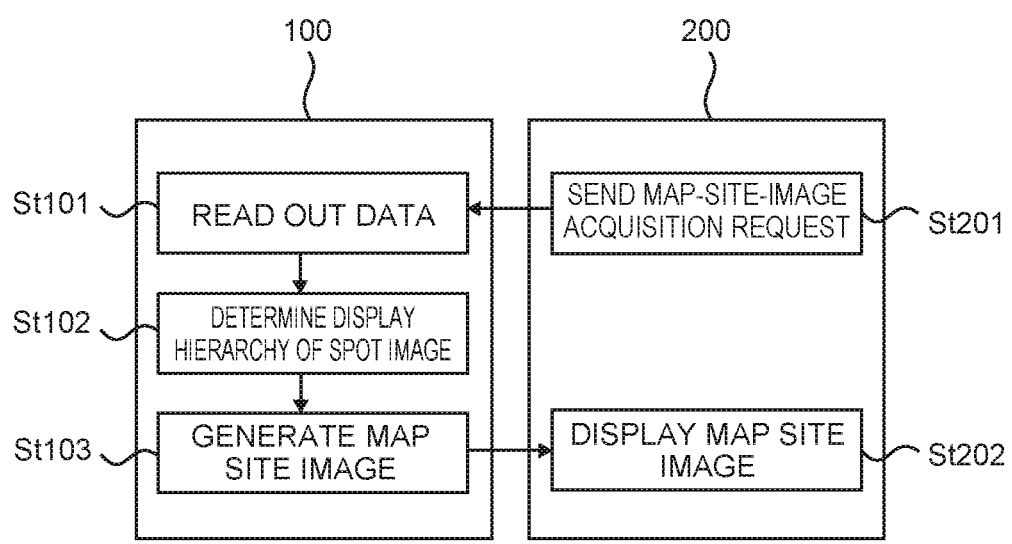
FIG. 15 is a flowchart showing operations of an information processing system according to a modification of the present invention.

In the above embodiment, the control unit 102 determines the size of the spot image depending on the attention index. However, a display hierarchy of the spot image may be determined depending on the attention index. FIG. 15 is a flowchart showing the operations of the information processing system 10 according to a modification.

As illustrated in FIG. 15, when the communication unit 103 receives the map-site-image acquisition request, the control unit 102 reads out the map data 101a, the spot data 101b, and the website data 101c from the storage unit 101 (St 101).

The control unit 102 can read out the necessary spot data 101b from the center coordinate or the scale of the map included in the map-site-image acquisition request. For example, the control unit 102 may read out the spot data 101b of which the location is positioned within a predetermined distance from the center coordinate of the map included in the request.

Next, for the spot data 101b read out from the storage unit 101, the control unit 102 determines the display hierarchy of the spot image depending on the attention index obtained from the evaluation information for the corresponding spot (St 102). The control unit 102 can set the spot image of a spot having a higher attention index to a higher display hierarchy, and set the spot image of a spot having a lower attention index to a lower display hierarchy.

Next, the control unit 102 generates a map site image (St 103). The control unit 102 identifies the position for the corresponding spot on the map on the basis of the location included in the spot data 101b, and places the spot image of the spot on or near the spot.

Figure 16:
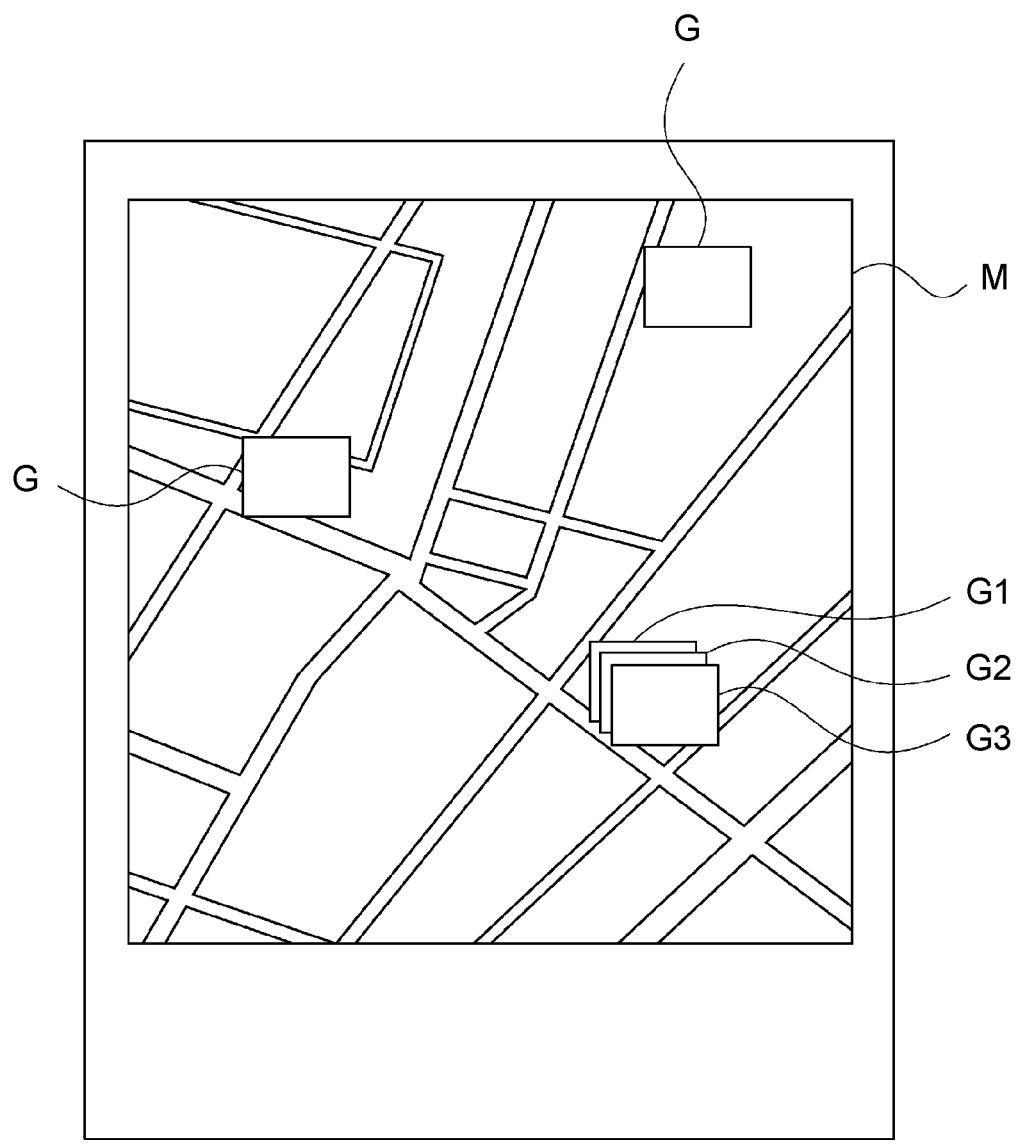
FIG. 16 is an example of an image generated by the user terminal included in the information processing system.

As illustrated in FIG. 13, when the spot images G1 to G3 are overlapped with one another on the map M, the overlapping spot images may be overlapped in the order of the display hierarchies determined at the prior step. FIG. 16 is an example of a map site image generated by the control unit 102. As illustrated in FIG. 16, the control unit 102 can place the spot images so as to overlap the spot image in the higher hierarchy upon the spot image in the lower hierarchy. In FIG. 16, the hierarchy of the spot image G1 is the lowest and the hierarchy of the spot image G3 is the highest.

The control unit 102 controls the communication unit 103 to send the generated map site image to the communication unit 201. The control unit 202 outputs the map site image received by the communication unit 201 to the display to display the map site image on the display (St 202).

The information processing system performs the aforementioned operations. As described above, on the map site image, the spot image is displayed in the display hierarchy determined depending on the attention index obtained from the evaluation information for the corresponding spot. Accordingly, a user can easily see a spot having a higher attention among the spots on the map. Further, since a spot having a lower attention is displayed in a lower hierarchy, the spot having the lower attention does not disturb a user who watches the map, and thus, the excellent convenience is exerted. Further, since the display hierarchy of the spot image having the lower attention is lowered, load applied to the server device 100 is reduced.

As described above, in the information system according to the present invention, the display form of the spot image such as the size, the display frequency or the display hierarchy of the spot image is determined depending on the attention index of the spot, and the visibility of the spot image of a spot having the higher attention index is further improved. The display form of the spot image determined depending on the attention index is not limited to those described herein, as long as the spot image of a spot having a higher attention index is provided with further improved visibility.

(Display 1 of Map Image Generated by User Terminal)

Figure 17:
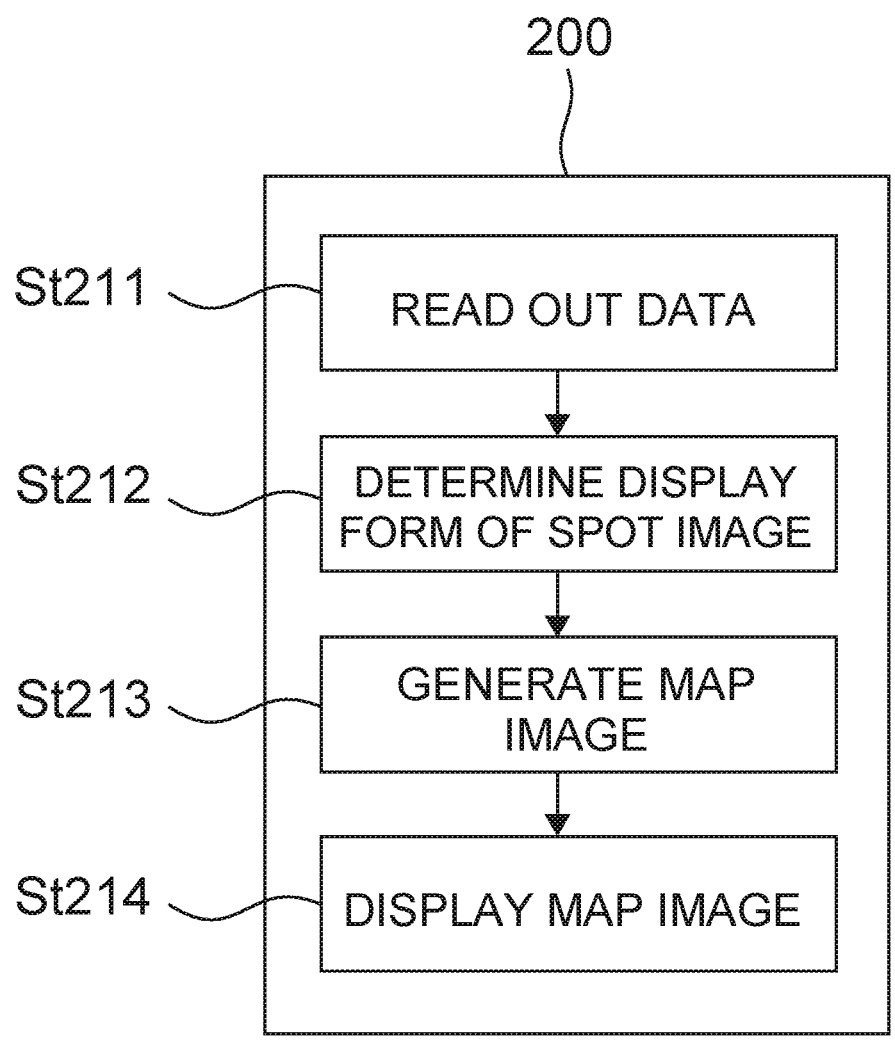
FIG. 17 is a flowchart showing operations of the information processing system according to the modification of the present invention.

In the above embodiment, the control unit 102 of the server device 100 generates the map site image. However, the control unit 202 of the server terminal 200 may generate an image (hereinafter, "map image") including a map. For example, the map image is an image generated through a map application. FIG. 17 is a flowchart showing operations of the user terminal 200 in this case. In the storage unit 203, map data and spot data are stored in advance. The spot data may be data on which evaluation information has been reflected and which is downloaded in advance by the server device 100.

As illustrated in FIG. 17, the control unit 202 reads out the map data and the spot data from the storage unit 203 (St 211), determines, similarly to the control unit 102 as in the above description, the display form of the spot image depending on the attention index obtained from the evaluation information for the corresponding spot (St 212), and generates a map image (St 213). The display form includes the size, the display frequency, and the display hierarchy of the spot image, which have been described above. The control unit 202 outputs the map image to the display to display the map image on the display (St 214).

(Display 2 of Map Image Generated by User Terminal)

In the above embodiment, the control unit 102 of the server device 100 generates the map site image. However, the control unit 202 of the user terminal 200 may generate a map image. The information processing system 10 may be a navigation system and the user terminal 200 may a navigation device used for a vehicle navigation system, etc. The map image may be an image generated by the navigation device.

Figure 18:
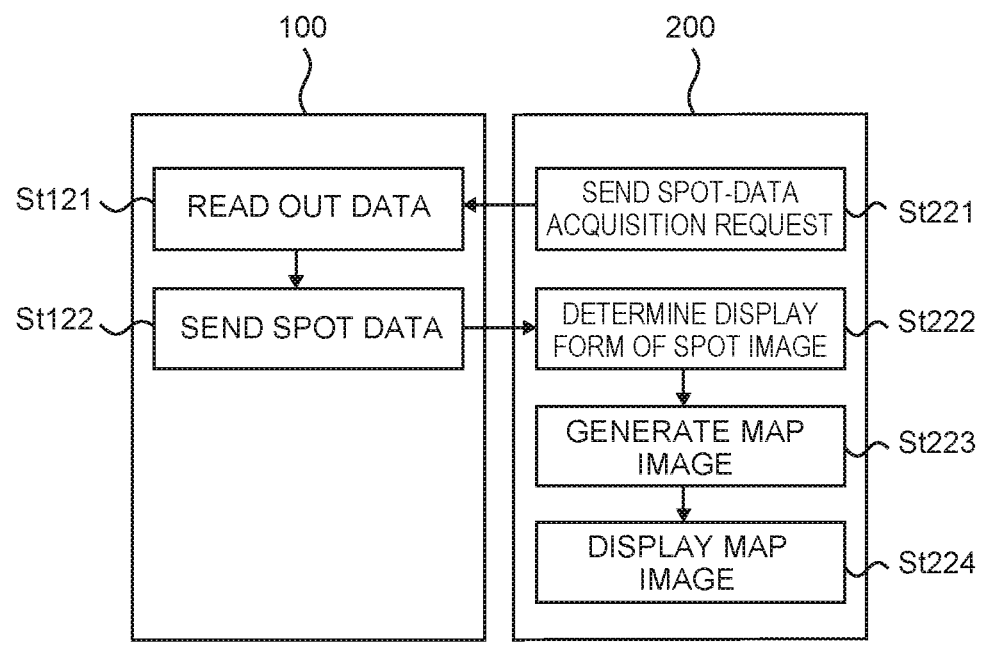
FIG. 18 is a flowchart showing operations of the information processing system according to the modification of the present invention.

FIG. 18 is a flowchart showing operations of the server device 100 and the user terminal 200 in this case. In the storage unit 101, spot data on which evaluation information has been reflected is stored in advance. In the storage unit 203, map data is stored in advance.

As illustrated in FIG. 18, the control unit 202 controls the communication unit 201 to send the spot-data acquisition request to the communication unit 103 (St 221). The control unit 102 reads out the spot data from the storage unit 101 (St 121), and controls the communication unit 103 to send the spot data to the communication unit 201 (St 122). The spot data includes at least the evaluation information and the spot image.

When the communication unit 201 receives the spot data, the control unit 202, similarly to the control unit 102 as in the above description, determines the display form of the spot image depending on the attention index obtained from the evaluation information for the corresponding spot (St 222), and generates a map image by using the map data read out from the storage unit 203 (St 223). The display form includes the size, the display frequency, or the display hierarchy of the spot image, which have been described above. The control unit 202 outputs the map image to the display to display the map image on the display (St 224).

The invention claimed is:

1. An information processing device comprising:
    storage means for storing therein a plurality of spot images associated with corresponding spot locations on a map;
    communication means for receiving evaluation information for each of the spot locations; and
    control means for determining, for each of the plurality of spot images, a size of the spot image depending on an attention index obtained from the corresponding evaluation information, generating a website image in which the plurality of spot images are placed on the map with the determined sizes, and controlling the communication means to send the website image to a separate information processing device.

2. The information processing device according to claim 1, wherein
    if a first spot image among the plurality of spot images is overlapped with a second spot image among the plurality of spot images on the map, the control means generates the website image in which the first spot image is placed outside the map and the fit spot image is connected, by a connection line, with a first spot location which is on the map and which is associated with the first spot image.

3. The information processing device according to claim 1, wherein
    if a ratio of the spot image on the map is equal to or greater than a predetermined ratio, the control means generates the website image in which the spot image is placed outside the map and the spot image is connected, by a connection line, with one of the spot locations which is on the map and which is associated with the spot image.

4. The information processing device according to claim 1, wherein
    the control means assigns an identifier to each spot image, the identifier indicating image details of the spot image, and
    if the communication means receives, from the separate information processing device, an acquisition request for the website image including a search condition, the control means selects, as the spot images to be placed in the website image, the spot images to which the identifier corresponding to the search condition is given.

5. The information processing device according to claim 1, wherein
    the control means determines a display form of the spot images depending on the attention index obtained from the evaluation information, generates the website image in which the spot images are placed on the map, and transmits the website image to the separate information processing device.

6. The information processing device according to claim 5, wherein if some of the plurality of spot images are overlapped with one another on the map, the control means selects, based on a frequency according to the attention index, a spot image to be placed on the map from among the some of the plurality overlapping spot images.

7. The information processing device according to claim 5, wherein if some of the plurality spot images are overlapped with one another on the map, the control means causes the overlapping spot images to overlap with one another in an order according to the attention indices.

8. The information processing device according to claim 1, wherein at least one of the plurality of spot images is a photo.

9. The information processing device according to claim 1, wherein at least one of the plurality of spot images is a graphic.

10. An information processing system comprising:
a first information processing device including:
   storage means for storing therein a plurality of spot images associated with corresponding spot locations on a map,
   first communication means for receiving evaluation information for each of the spot locations, and
   first control means for determining, for each of the plurality of spot images, a size of the spot image depending on an attention index obtained from the corresponding evaluation information, generating a website image in which the plurality spot images are placed on the map with the determined sizes, and controlling the first communication means to send the website image to a second information processing device; and
the second information processing device including:
   second communication means for receiving the website image from the first communication means, and
   second control means for causing the website image to be displayed.

11. A navigation system comprising:
an information processing device including:
   storage means for storing therein a plurality of spot images associated with corresponding locations on a map,
   first communication means for receiving evaluation information for each of the spot locations, and
   first control means for controlling the first communication means to send the evaluation information and the plurality of spot images to a navigation device; and
the navigation device including:
   second communication means for receiving the evaluation information and the plurality of spot from the information processing device, and
   second control means for determining, for each of the plurality of spot images, a size of the spot image depending on an attention index obtained from the corresponding evaluation information, generating a map image in which the plurality of spot images are placed on the map with the determined sizes, and causing the map image to be displayed.

12. An information processing method comprising:
storing a plurality of spot images associated with corresponding spot locations on a map;
receiving evaluation information for the spot locations; and
determining, for each of the plurality of spot images, a size of the spot image depending on an attention index obtained from the corresponding evaluation information, generating a website image in which the plurality of spot images are placed on the map with the determined sizes, and performing control to send the website image to a separate information processing device.

13. A program causing an information processing device to execute:
a step of storing a plurality of spot images associated with corresponding spot locations on a map;
a step of receiving evaluation information for each of the spot locations; and
a step determining, for each of the plurality of images, a size of the spot image depending on an attention index obtained from the corresponding evaluation information, generating a website image in which the plurality of spot images are placed on the map with the determined sizes, and performing control to send the website image to a separate information processing device.

* * * * *